(12) United States Patent
Cody (10) Patent No.: US 10,257,655 B2
(45) Date of Patent: Apr. 9, 2019

(54) CONTACT GRAPH GENERATION FOR MOBILE AND GROUND STATION NODES

(71) Applicant: Raytheon Company, Waltham, MA (US)

(72) Inventor: Mac Allen Cody, Richardson, TX (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 15/154,127

(22) Filed: May 13, 2016

(65) Prior Publication Data

US 2017/0331710 A1    Nov. 16, 2017

(51) Int. Cl.

| | |
|---|---|
| *H04W 4/02* | (2018.01) |
| *H04B 7/185* | (2006.01) |
| *H04W 48/16* | (2009.01) |
| *H04L 12/26* | (2006.01) |
| *H04W 24/02* | (2009.01) |
| *H04L 12/24* | (2006.01) |

(52) U.S. Cl.
CPC ........ *H04W 4/027* (2013.01); *H04B 7/18515* (2013.01); *H04L 41/12* (2013.01); *H04L 43/067* (2013.01); *H04L 43/0811* (2013.01); *H04W 24/02* (2013.01); *H04W 48/16* (2013.01); *H04L 43/062* (2013.01)

(58) Field of Classification Search
CPC ..... H04W 4/027; H04W 24/02; H04W 48/16; H04B 7/18515; H04L 41/12; H04L 43/067; H04L 43/0811; H04L 43/062
See application file for complete search history.

(56) References Cited

U.S. PATENT DOCUMENTS

| | | | | |
|---|---|---|---|---|
| 5,678,174 A | * | 10/1997 | Tayloe | ...................... G01S 5/08 |
| | | | | 342/357.64 |
| 6,115,580 A | * | 9/2000 | Chuprun | ................. H04W 4/04 |
| | | | | 455/1 |

OTHER PUBLICATIONS

Lai, Yongxuan et al. "Adaptive Data Gathering in Mobile Sensor Networks Using Speedy Mobile Elements", 2015, Sensors 2015, vol. 15, Issue 9, pp. 23218-23248.*

(Continued)

*Primary Examiner* — Manuel L Barbee
(74) *Attorney, Agent, or Firm* — Schwegman Lundberg & Woessner, P.A.

(57) ABSTRACT

A method for generating contact graphs for delay/disruption tolerant networking for a constellation of network nodes (e.g., satellites in low earth orbit, terrestrial sensors, and ground stations). A contact graph indicates the availability and data rates for communications links between spacecraft and ground stations. The links may be intermittent due to orbital dynamics and the earth's rotation, and may be line-of-sight or relayed. The method predicts the future locations of satellite nodes in the Earth Centered inertial reference frame, and converts the locations of terrestrial nodes by converting their coordinates from the Earth Centered Earth Fixed reference frame. The method also determines whether line-of-sight links are possible, and estimates the closing velocity between network nodes to estimate signal Doppler shift. Contact graph routing determines the links used to most effectively move data over the network. Output data files may be directly used by Interplanetary Overlay Network administration software.

30 Claims, 8 Drawing Sheets

(56) References Cited

OTHER PUBLICATIONS

De Rango, F. et al. "Epedimic Strategies in Delay Tolerant Networks from an Energetic Point of View: Main Issues and Performance Evaluation", Jan. 2015, Journal of Networks; Oulu, vol. 10, Issue 1, pp. 4-14.*

* cited by examiner

CONTACT GRAPH GENERATION FOR MOBILE AND GROUND STATION NODES

TECHNICAL FIELD

This document relates to improvements in delay/disruption tolerant networking (DTN), and more specifically to predicting availability time ranges for communications network nodes and Doppler frequency shifts during those time ranges, and generating a contact graph for optimizing network messaging.

BACKGROUND

Coordinating communications between mobile and intermittently connecting network nodes, such as terrestrial and satellite based transceivers, is a challenging problem. Such nodes generally require an unobstructed spatial path or "line-of-sight" for reliable signal transfer. The availability of a direct messaging link between any two network nodes may therefore be limited by the position and velocity of the nodes over time. For example, when a satellite in low earth orbit (LEO) is in view of a ground station or another spacecraft then direct communications may be possible, but when the nodes are obstructed by the earth then direct communications may not be possible. Further, the relative closing velocity of the two nodes will cause a Doppler frequency shift in the transferred signals, and the network hardware may have a limited frequency shift tolerance. Contact graph routing (CGR) techniques have been developed for managing messaging in spite of network delays or disruptions, by relaying data through intermediate nodes. Generation of contact graphs that accurately predict node availability may enable optimum application of such techniques to intermittently connecting mobile network nodes.

Overview

The present inventor has recognized, among other things, that particular improvements of the apparatus and methods used for contact graph generation for mobile network nodes are possible and would enable specific distinct advantages.

In an example, a method for generating new contact graph data for communications nodes in a communications network may include, for each of at least two communications nodes, receiving data describing a position and a velocity of the node, and predicting future positions of the node in a common reference frame. The method may further include determining a time range of possible line-of-sight communications between two of the nodes using geometric modeling of the earth to predict a loss of signal, and estimating a closing velocity between two of the nodes and a resulting Doppler shift of communications between the two nodes. Finally, the method may include outputting new contact graph data comprising the time range and the closing velocity information.

In an example, a computer program product for generating new contact graph data for communications nodes in a communications network may include a non-transitory computer-readable medium including executable instructions that, when executed, cause a processor to carry out a set of actions. For each of at least two communications nodes, the processor may receive data describing a position and a velocity of the node, and predict future positions of the node in a common reference frame. The processor may further determine a time range of possible line-of-sight communications between two of the nodes using geometric modeling of the earth to predict a loss of signal, and estimate a closing velocity between two of the nodes and a resulting Doppler shift of communications between the two nodes. Finally, the processor may output new contact graph data comprising the time range and the closing velocity information.

In an example, an apparatus for generating new contact graph data for communications nodes in a communications network may include a receiver circuit that receives data describing a position and a velocity of a node, a predictor circuit that predicts future positions of the node in a common reference frame, a solver circuit that determines a time range of possible line-of-sight communications between two nodes using geometric modeling of the earth to predict a loss of signal, an estimator circuit that estimates a closing velocity between two nodes and a resulting Doppler shift of communications between the two nodes, and a data generator circuit that outputs new contact graph data comprising the time range and the closing velocity information.

In an example, a system for generating new contact graph data for communications nodes in a communications network may include means for receiving data describing a position and a velocity of a node, means for predicting future positions of the node in a common reference frame, means for determining a time range of possible line-of-sight communications between two nodes using geometric modeling of the earth to predict a loss of signal, means for estimating a closing velocity between two nodes and a resulting Doppler shift of communications between the two nodes, and means for outputting new contact graph data comprising the time range and the closing velocity information.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
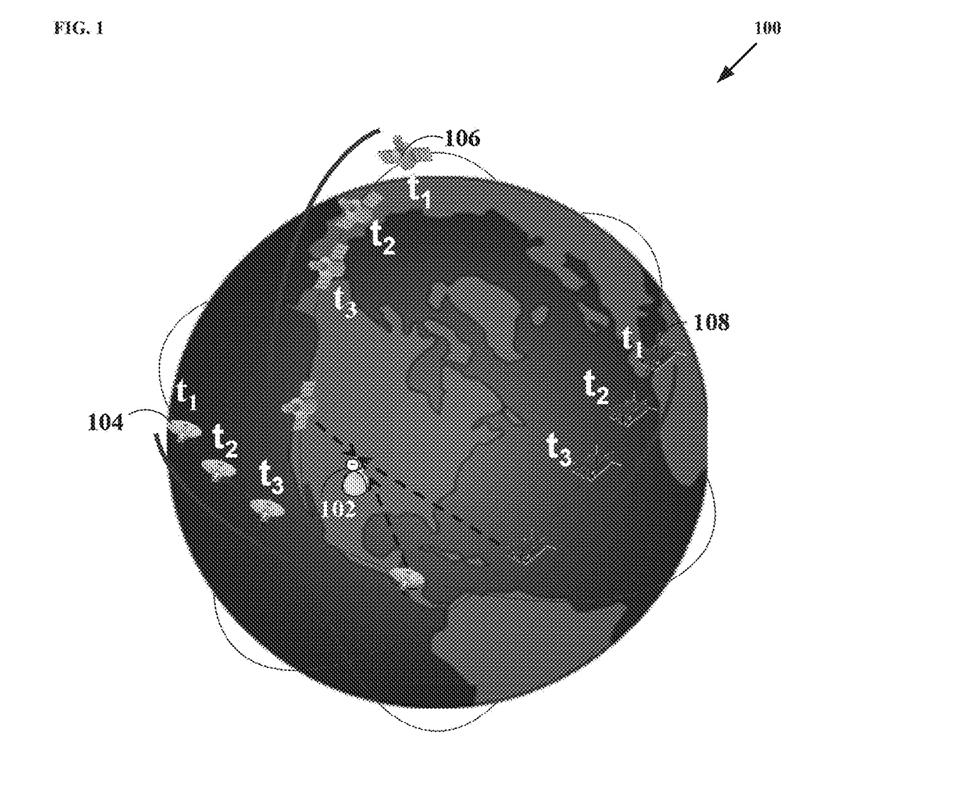
FIG. 1 shows an example of a communications system 100 with messages transferred between a ground station and a set of satellites.

FIG. 1 shows an example of a communications network 100. In this example, a mission ground station (MGS) 102 may be a communications node that is fixed at a point on the earth's surface. Each communications node in the communications network 100 may include a number of transmitters and/or receivers each capable of processing messages. In this example, the communications network 100 further includes three orbiting satellites 104, 106, and 108. Each orbiting satellite may travel in a different orbit, such as in low earth orbit. LEO satellites may travel at an altitude of 300 km or more, and may orbit the earth approximately once every 90 minutes, depending on their particular orbital parameters.

In this example, mission ground station 102 has a line-of-sight for direct communications with satellite 104, shown here as traveling in a substantially equatorial orbit. The position of satellite 104 is shown at three different time points $t_1$, $t_2$, and $t_3$. Satellite 106 is shown as traveling in a substantially polar orbit, with its positions at time points $t_1$, $t_1$, and $t_3$ also shown. Satellite 108 is shown as traveling in a high-inclination retrograde or east-to-west orbit, with its positions at time points $t_1$, $t_2$, and $t_3$ also shown. The disclosure is not limited in this respect, however.

Communications network 100 may also include other communications nodes that are not shown. The additional nodes may include those in other fixed ground stations, satellites not in orbit around the earth, and terrestrial nodes that are on the earth's surface or relatively near it, e.g., within thousands of feet. Terrestrial nodes may for example include ground vehicles, airborne vehicles, and seaborne vehicles. Ground vehicles may include for example cars, trucks, trains, and other mobile machines. Individual persons traveling on foot may also carry communications equipment to implement a node for example.

Airborne vehicles may include airplanes and unmanned aerial vehicles (UAVs) or missiles for example, and seaborne vehicles may include ships, submarines, buoys, and remotely operated vehicles (ROVs). Fixed ground stations may be on land or on platforms or other attachments at sea for example, and may include manned facilities as well as unmanned sensors and transponders. Satellites not in orbit around the earth may include spacecraft in orbit around other bodies, such as the sun, the moon, Mars, etc., or in non-orbital trajectories such as those of exploratory spacecraft. The disclosure is not limited in this respect, however.

Figure 2:
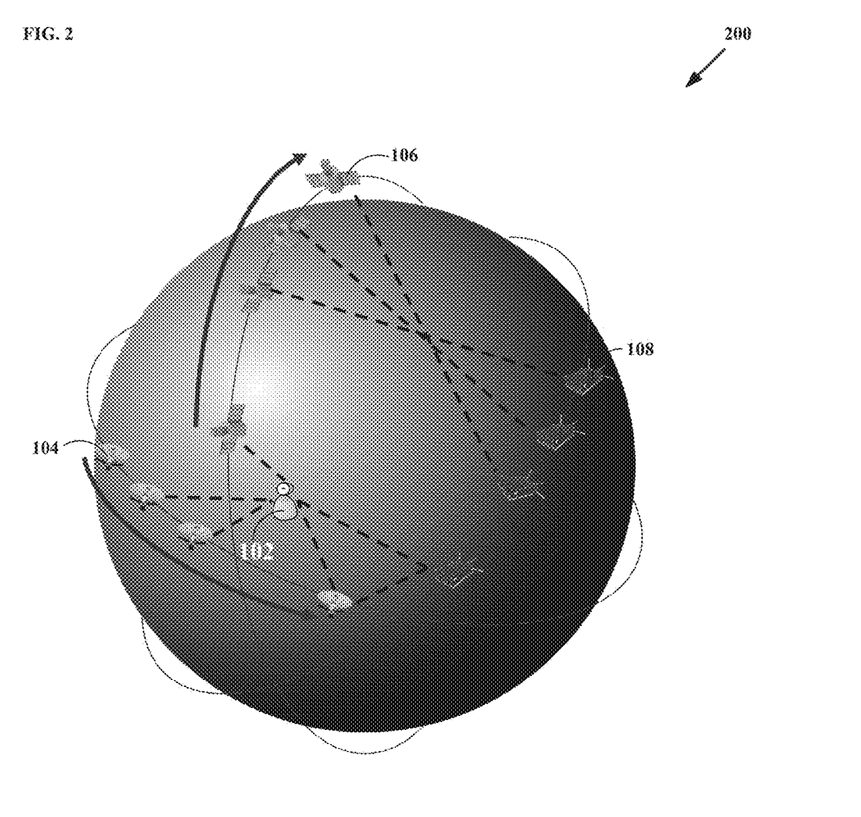
FIG. 2 shows an example of a communications system 200 with messages transferred between a ground station and a set of satellites, and between individual satellites.

FIG. 2 shows an example of a communications system 200 with messages transferred between a ground station and a set of satellites, and between individual satellites. Surface features are removed for clarity. Satellites such as 104, 106, and 108 may have lines-of-sight with each other at various times as shown, depending on their orbital dynamics. Satellites may therefore communicate directly with each other at such times, perhaps including times when direct communications with mission ground station 102 is not possible. Obstruction by the earth is generally the primary cause of disruption in network connectivity. Obstruction by other bodies such as the moon, Mars, sun, etc. is of course possible in other scenarios, such as exploratory missions.

Communications nodes may be limited in the times in which they are active. Thus, even if two nodes have a line-of-sight view of each other, some or all of the nodes may be inactive during at least part of that time so that no communications are possible. Nodes may also be deemed inactive during specific times, such as when their orbits are being adjusted, when the line-of-sight to another node passes close to the sun, or during particular space weather events such as a coronal mass ejection. A node may be designated as inactive by setting its maximum data rate to zero, for example, during relevant time ranges.

Communications management may be further complicated by Doppler shift considerations. When a transmitter and a receiver move relative to each other, e.g., with some closing velocity along the line-of-sight, the receiver perceives a frequency shift of the transmitted frequency. Communications hardware may be limited in the amount that it can shift a receiver's tuned receiving frequency and/or a transmitter's tuned transmitting frequency to compensate for this effect. The rate of frequency change between a transmitter and a receiver would generally be greatest during the middle of the communications period. A pre-defined frequency range based on the equipment involved may form a conceptual 'guard band' around a central frequency, in which communications are possible. If a signal's frequency exits this range due to the Doppler shift then communications may be interrupted. Prevention of a communications link failure therefore may depend on knowledge of the Doppler shift information.

The communications system 200 may be tasked with maximizing the overall message capacity that it can handle, which involves performing a highly constrained routing optimization. Each pair of nodes may be available for inter-node communications only intermittently, due primarily to the earth's rotation for example. Each pair of nodes may be able to tolerate only a limited closing velocity due to Doppler effect issues. Each node may be capable of handling only a given data rate in a given direction, and then only during the times that it is active.

Communications contacts exhibit characteristics that are both scheduled and somewhat opportunistic. Messages may be sent directly between nodes when needed, but often only some time after a satellite has come into view for example, Similarly, messages may be relayed through an intermediate node, but only after the communications system has recognized such possibilities. Both direct and relayed communications times may be limited to minutes in some cases, so the delays in recognizing communications opportunities may be significantly reduce overall network capacity.

There has been a trend toward more predictable, scheduled network operations and less opportunistic management recently. For example, the Interplanetary Overlay Network (ION) has been implemented as a networking model supporting delay/disruption tolerant networking concepts. It provides Internet-like protocols for spacecraft and ground stations separated by interplanetary distances, variant data transmission rates, and intermittent communications links. Contact graph routing (CGR) facilitates networking over such communications links.

A contact graph indicates the availability and data rates for communications links between communications nodes, such as spacecraft and ground stations. Contact graph routing determines the links that are actually used to efficiently move data over the network. Contact graph routing for orbiting constellations of LEO satellites is challenging due to the issues that cause and constrain intermittent communications, as described above.

A communications system of the future that is more precisely predictive would advantageously improve communications availability and reliability. With such a system, essentially all feasible communications opportunities may be recognized in advance and then best exploited. This disclosure enables such a system, by providing an efficient approach to generating contact graphs for such use.

Figure 3:
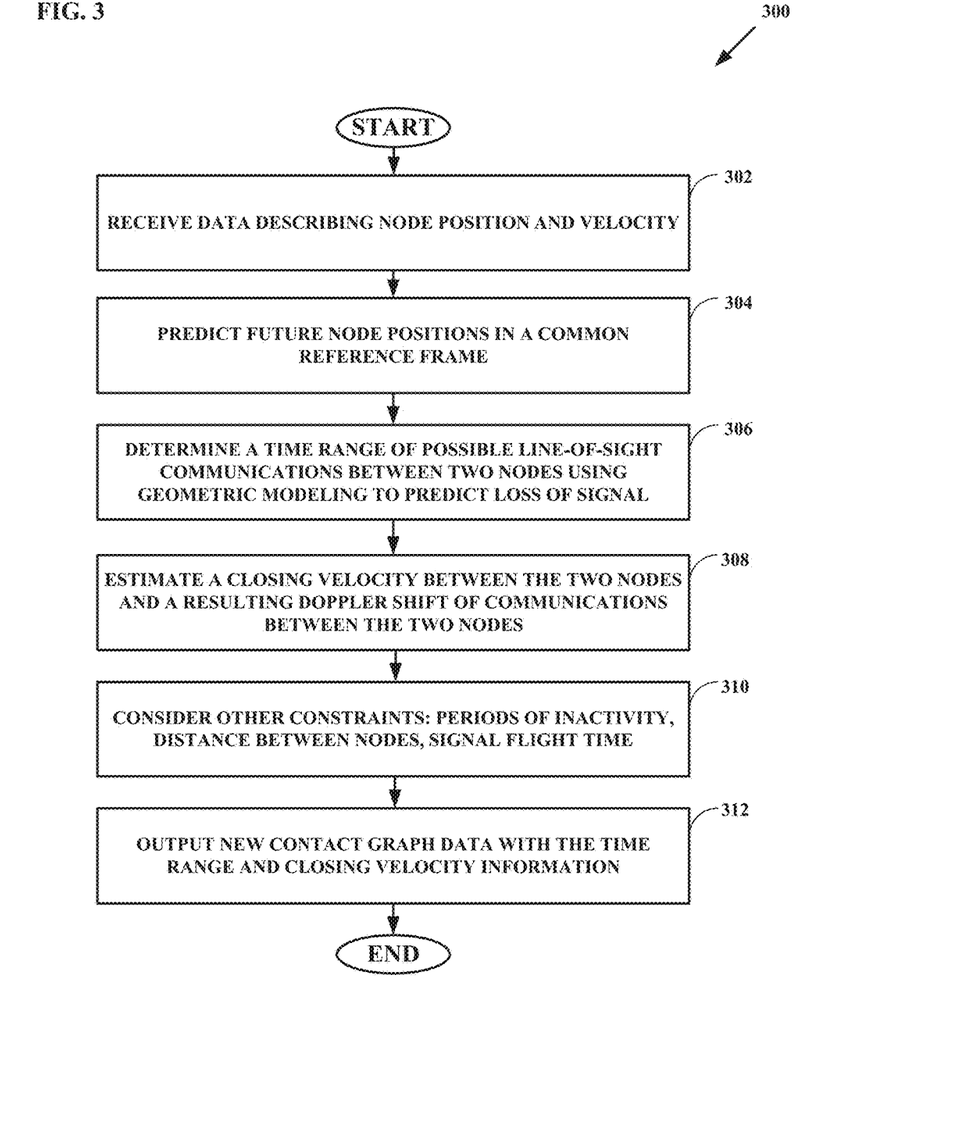
FIG. 3 shows an example of a new contact graph generation method 300.

FIG. 3 shows an example of a new contact graph generation method 300. The method may process data for each of at least two nodes in a communications network. At 302, the method may receive data describing the position and velocity of a node in the communications network. In an example, orbital nodes may determine their own global positioning system (GPS) data using onboard GPS receivers. They may transmit the data including their position and velocity information to a mission ground station when passing overhead. For terrestrial nodes, such GPS data may be supplied to the mission ground station via terrestrial networks, and can be provided on an ad hoc basis. More traditional observational methods may also determine node position and velocity, though generally with less precision than GPS. Static ground stations may have coordinates that are either well known or may also be obtained via GPS.

Terrestrial nodes may provide their data in terms of an Earth-Centered Earth-fixed (ECEF) reference frame. This reference frame treats the earth's center of mass as its origin, and rotates with the earth. Positions may be described in terms of distances with respect to a reference pole and a reference meridian, such as the north pole and the Greenwich meridian. Conversion to ECEF from conventional angular longitude and latitude data, and altitude data is straightforward. The ECEF reference is convenient for terrestrial nodes because the ECEF coordinates of a fixed ground station do not change over time.

Orbital nodes may provide their data in terms of an Earth-Centered Inertial reference frame. This reference frame also treats the earth's center of mass as its origin, but it does not rotate with the earth. The earth's rotational axis, the direction of the vernal equinox, and the earth's equatorial plane define the ECI unit vectors. This reference frame may often be referred to as "celestial coordinates". The positions of terrestrial nodes, except for extremely fast aircraft, move in the ECI reference frame primarily due to the earth's rotation. Orbital nodes will maintain substantially constant Keplerian orbital paths in ECI space.

The disclosure is not limited in this respect, however. Other reference frames are known and may also be used, such as a barycentric reference frame for earth-moon communications systems, or for managing exploratory missions, etc. The International Celestial Reference System (ICRS) is a reference frame used for high-precision positional astronomy for example.

Mobile nodes may record their positions at a number of time points using their own UPS data. They may also share this data with other mobile UPS-equipped nodes as well as ground stations. The result may be a reduction of systematic error, for increased overall accuracy. The position and velocity data may be provided in a Two-Line Element message data format, used by position propagation software.

Figure 4:
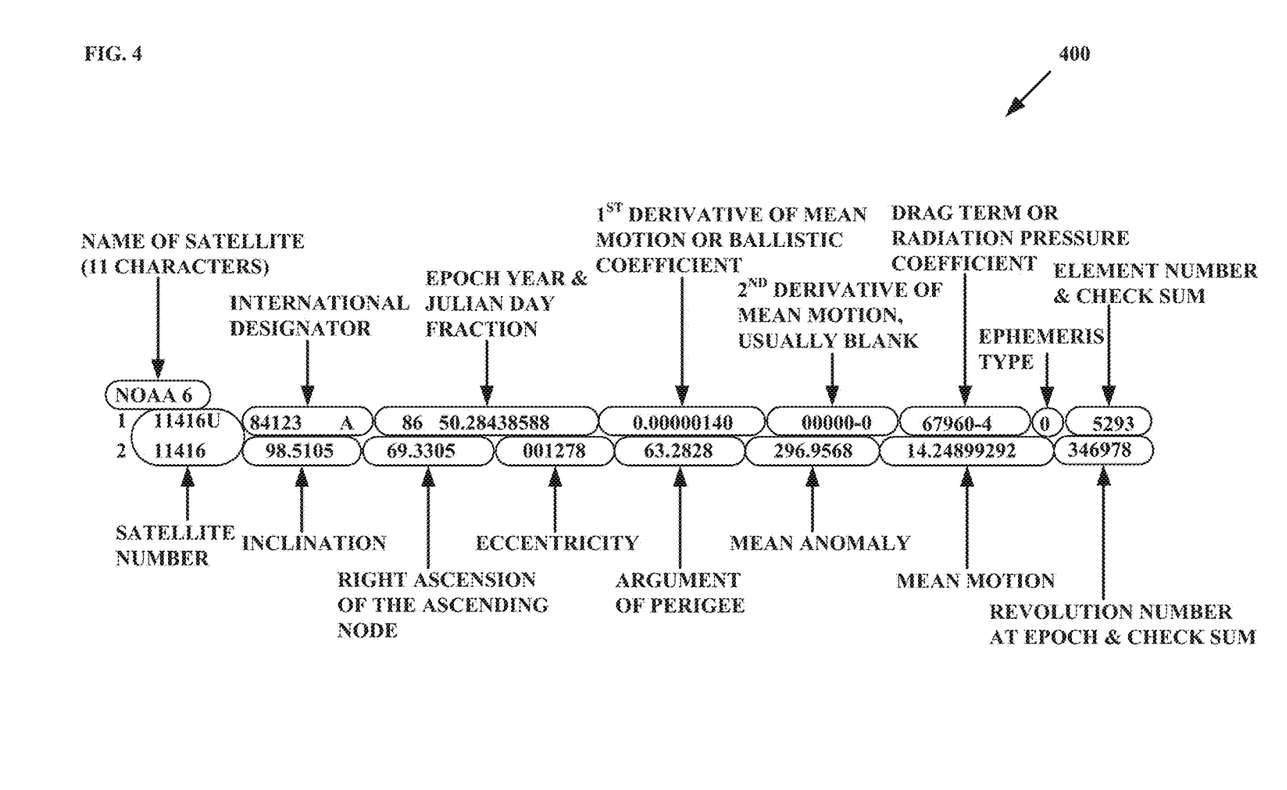
FIG. 4 shows an example of a Two-Line Element (TLE) message 400.

FIG. 4 shows an example of a Two-Line Element message 400. This widely used format includes two 80-character lines of ASCII text to store orbital elements for an object for a given time point. The time point may be described as the number of seconds or minutes since a particular reference time point or epoch. The TLE is the de facto standard format for distribution of such data, however any data format may be considered within the scope of the disclosure.

The position and velocity data may for example be augmented by information describing when a node will be active. The position and velocity data may also be generated from transit plans, e.g., a route plan for ground nodes, a flight plan for airborne nodes, and a navigation plan for seaborne nodes. Information about a node's data rate, for either transmitting, receiving, or both, may also be provided.

In an example, a test network may be defined using the following data and TLEs:

Ground. Station (Node 01) Coordinates:
Latitude: 32.969655, Longitude: −96.745013, Altitude: −0.027058 km. Note:
Altitude was adjusted from zero km to accommodate the oblate spheroid approximation.
Satellite A (Node 02) TLE:
CUTE-1 (CO-55)
1 27844U 03031E 15206.62846352 0.00000094 00000-0 62296-4 0 9994 2 27844 98.6954 214.6070 0009537 182.4686 291.6066 14.21826571625906
Satellite B (Node 03) TLE
EYESAT-1 (AO-27)
1 22825U 93061C 15206.4940396 0.00000026 00000-0 27596-4 0 9999 2 22825 98.7110 156.6191 0008077 188.9102 296.3181 14.29893689138413
Satellite C (Node 04) TLE
CUBESAT (CO-57)
1 27848U 03031) 15207.57426487 0.00000076 00000-0 54959-4 0 9993 2 27848 98.7052 215.4671 0009372 187.3807 294.1498 14.21470579625946

In this example, all node locations are propagated for twenty-four hours starting at a reference time of 25 Jul. 2015 15:36:00 UTC.

At 304, the method may predict future positions of the node in a common reference frame. The ECI reference frame may be the most computationally convenient frame for managing a fleet of satellites. An embodiment may therefore convert received position and velocity vectors for a mission ground station and terrestrial nodes to this reference frame. However, any reference frame may be used.

Figure 5:
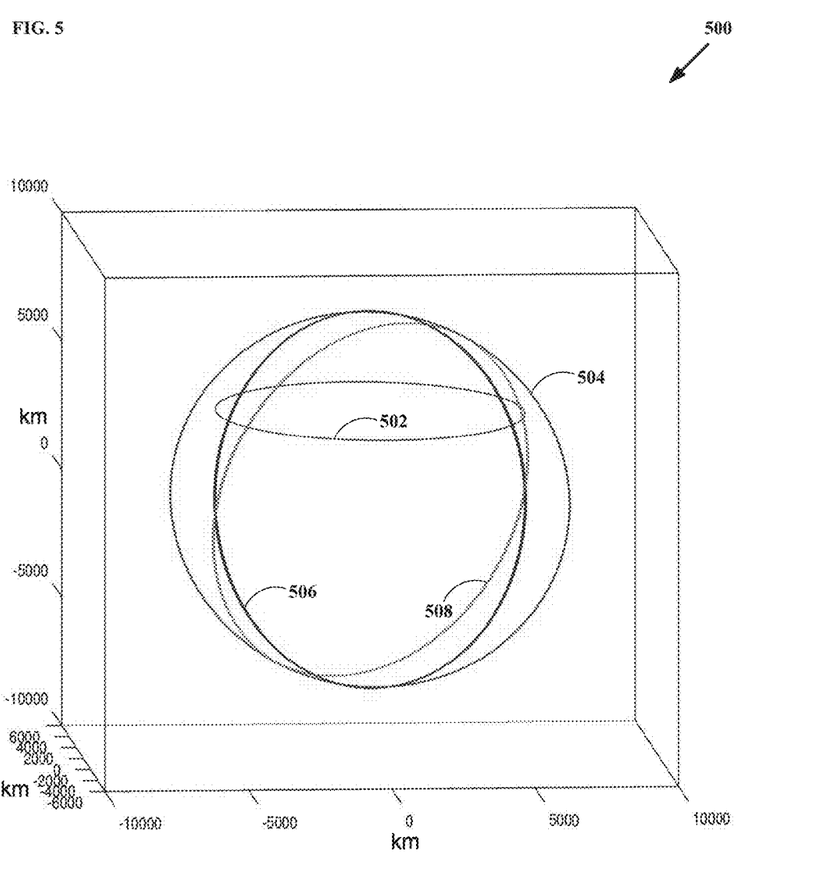
FIG. 5 shows an example of the trajectories of a ground station and three satellites in the Earth-Centered Inertial (ECI) reference frame 500.

FIG. 5 shows an example of the trajectories of a ground station and three satellites in the ECI reference frame 500. The earth is not shown in this figure, for clarity, but its center of mass is at the coordinate origin. The ground station may follow a circular trajectory 502, rotating around the earth's axis along with the rest of the earth. Terrestrial nodes, not shown, will also follow a nearly circular trajectory, moving primarily due to their rotation around the earth's axis, but also traveling relative to the earth's surface at their own course and speed. The satellites may each proceed through various positions over time in their particular substantially static (in this reference frame) orbital trajectories 504, 506, and 508.

Once a set of position and velocity vectors for a given node are received, the method may derive orbital parameters that describe the node's general motion. In a conventional orbital model, these parameters may include for example an inclination, a right ascension of the ascending node, an eccentricity, an argument of perigee, a mean anomaly, and a mean motion, or other parameters. For non-orbital trajectories, such as for exploratory missions, a different model formulation may be defined.

The method may determine the position and velocity of any node at any time from the corresponding model's orbital parameters and knowledge of the node's position at a given time. In an example, the method may use the Simplified General Perturbations model 4 (SGP4), which is a frequently used published model and computer program implementation for calculating satellite data. The disclosure is not limited in this respect, however.

The method may therefore propagate position and velocity data for any given node for any future time. In an example, such predictions may be distributed to all the nodes in a communications system. Predicted location data may also be obtained by and/or provided to mission planning software, such as the joint Mission Planning System (JMPS) and the future Department of Defense XPlan application.

At 306, the method may determine a time range of possible line-of-sight communications between two nodes using geometric modeling of the earth to predict a loss of signal. Both terrestrial and orbital nodes may be considered. The line-of-sight will occur when one node is not obstructed by the earth (or other planetary body or the sun, in other scenarios). Obstruction by terrain may also be determined, if terrain model data is available.

The determination thus involves calculating when a line segment between the two nodes will progress from intersecting the earth to not intersecting the earth (when the line-of-sight "opens"), and when a subsequent intersection of the line segment with the earth occurs (when the line-of-sight "closes"). The timing of these two events defines when a communications opportunity is available. Correspondingly, a maximum duration of the communications opportunity may be calculated in advance, so that timely data deliveries may be optimally arranged.

Note that for electromagnetic communications, signal flight time for LEO satellites may be almost insignificant. For example, light travels ten thousand km in approximately 33.4 milliseconds. However, for longer node-to-node distances the signal flight time may be significantly greater. For interplanetary missions for example, signal flight times of minutes or hours may occur. Message routing using predicted line-of-sight time ranges may consider the signal flight times involved, and transmit messages such that they arrive when a line-of-sight opens.

Further, although this disclosure may focus primarily on radio/microwave communications between nodes, use of the method for other signaling modes is also envisioned. For example, communications via sound in the earth's oceans and waterways may be accomplished, such as with acoustic modems. In such scenarios, the signal flight time is determined by the speed of sound versus the speed of light. The line-of-sight in such cases may refer to an unobstructed underwater pathway between nodes, where intervening terrain and reflections will have less impact. For acoustic signals, the line-of-sight may actually refer to a curved unobstructed path between nodes, such as at a particular depth range.

The simplest geometric earth model is a sphere, with an average radius of 6371 km. However, the earth is known to more closely resemble an oblate spheroid, with a polar radius that is less than the equatorial radius. A commonly used geometric reference model of better accuracy is the WGS84 reference ellipsoid, which uses an equatorial radius ($r_e$) of 6378.137 km and a polar radius ($r_e$) of 6356.752314245 km. The WGS84 model has the advantage of describing the earth with closed-form expressions, but it ignores the terrain and gravitational distortions.

Other more accurate models include the WGS84 geoid, the EGM96 geoid, and a global digital elevation model. These models are however more difficult to model mathematically, so direct algebraic determinations of line-of-sight obstruction times is not particularly feasible. The method may however use ray tracing techniques with such models to determine when unobstructed signal path events occur. The particular earth model used may drive the accuracy of the resulting line-of-sight time range estimates.

Figure 6:
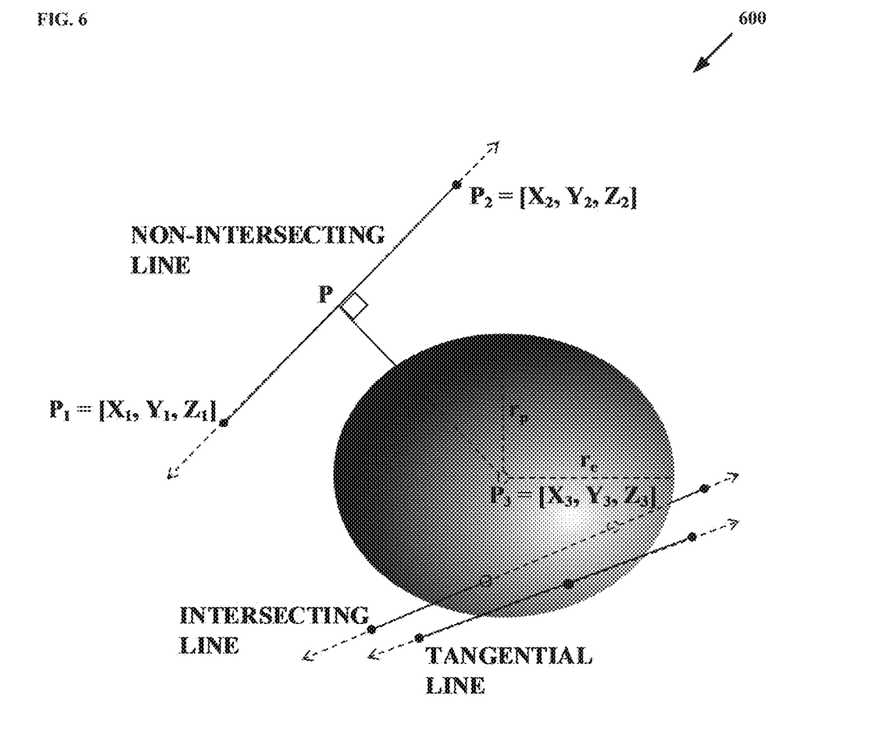
FIG. 6 shows an example of possible lines of sight for an oblate spheroid 600.

FIG. 6 shows an example of possible lines of sight for an oblate spheroid 600. The spheroid may represent the earth, moon, Mars, or other body, depending on the particular scenario. A line-of-sight may be defined as a line segment between two nodes located, at a particular time, at respective points $P_1$ and $P_2$, with $P_1$ at coordinates ($x_1$, $y_1$, $z_1$) and, $P_2$ at coordinates ($x_2$, $y_2$, $z_2$). Although each node is shown above the spheroid, it is possible that one or more of the points may be on or near its surface, as with a ground station or terrestrial node. The spheroid may be centered at point $P_3$ at coordinates ($x_3$, $y_3$, $z_3$), and have a polar radius of $r_p$ and a larger equatorial radius of $r_e$. Note that a spherical model may be considered a special case of the oblate spheroid where the polar radius and the equatorial adius are equal.

If the line between points $P_1$ and $P_2$ does not intersect the spheroid, then a clear line-of-sight exists between the two points. If the line between points $P_1$ and $P_2$ intersects the spheroid at two points, then a clear line-of-sight does not exist between the two points because the modeled body obstructs the two nodes. If the line between points $P_1$ and $P_2$ intersects the spheroid at only one point, so the line is tangential to the spheroid, that denotes that an obstruction exists, but may have just come into position or may be just about to move out of the way. Such events may respectively define the times where a line-of-sight may begin or end.

The intersection with the oblate spheroid may be determined mathematically as follows. A line may be defined by these equations:

$$x=x_1+u(x_2-x_1), y=y_1+u(y_2-y_1), z=z_1+u(z_2-z_1)$$

An oblate spheroid may be defined by this equation:

$$\frac{(x-x_3)^2}{r_e^2}+\frac{(y-y_3)^2}{r_e^2}+\frac{(z-z_3)^2}{r_p^2}=1$$

Substituting the variables with the line equations yields:

$$\frac{(x_1+u(x_2-x_1)-x_3)^2}{r_e^2}+\frac{(y_1+u(y_2-y_1)-y_3)^2}{r_e^2}+\frac{(z_1+u(z_2-z_1)-z_3)^2}{r_p^2}$$

This expression may be restated as a quadratic equation $au^2+bu+c=0$ where $$a=\frac{(x_2-x_1)^2+(y_2-y_1)^2}{r_e^2}+\frac{(z_2-z_1)^2}{r_p^2}$$

$$b=2\left[\frac{(x_2-x_1)(x_1-x_3)+(y_2-y_1)(y_1-y_3)}{r_e^2}+\frac{(z_2-z_1)(z_1-z_3)}{r_p^2}\right]$$

$$c=\frac{x_3^2+y_3^2+x_1^2+y_1^2-2(x_3x_1+y_3y_1)}{r_e^2}+\frac{z_3^2+z_1^2-2z_3z_1}{r_p^2}-1$$

The solution to the quadratic equation is:

$$\frac{-b\pm\sqrt{b^2-4ac}}{2a}$$

The exact line-of-sight behavior may be determined by the expression in the square root:

$$b\cdot b-4\cdot a\cdot c$$

If this term is less than zero, the line doesn't intersect the oblate spheroid, and a line-of-sight occurs. If this term is equal to zero, the line is tangent to the surface of the oblate spheroid, and a marginal line-of-sight occurs. In that event, atmospheric effects and/or terrain features may render communications unreliable. If this term is greater than zero, the line intersects the oblate spheroid at two points, so no line-of-sight exists.

The intersection points between the line and the spheroid may or may not fall within the line segment $P_1P_2$. Note that the closest point of the line through $P_1P_2$ to the point $P_3$ is along a perpendicular from $P_3$ to the line. If P is the closest point on the line then:

$(P_3-P) \text{dot}(P_2-P_1)=0$

Substituting the equation for the line into the above yields:

$[P_3-P_1-u(P_2-P_1)]\text{dot}(P_2-P_1)=0$

Solving this equation for u yields:

$$u = \frac{(x_3-x_1)(x_2-x_1)+(y_3-y_1)(y_2-y_1)+(z_3-z_1)(z_2-z_1)}{(x_2-x_1)(x_2-x_1)+(y_2-y_1)(y_2-y_1)+(z_2-z_1)(z_2-z_1)}$$

If u is not between 0 and 1, then the closest point is not between points $P_1$ and $P_2$.

At 308, the method may estimate a closing velocity between two nodes and a resulting Doppler shift of communications between the two nodes. The closing velocity may provide a frequency-independent representation of the Doppler shift. For a closing velocity $\Delta v$ that is small compared to the signal flight time (e.g., c for electromagnetic signals), the frequency shift from transmitted frequency for may be estimated by the formula:

$$f = \left(1 + \frac{\Delta v}{c}\right)f_0$$

Figure 7:
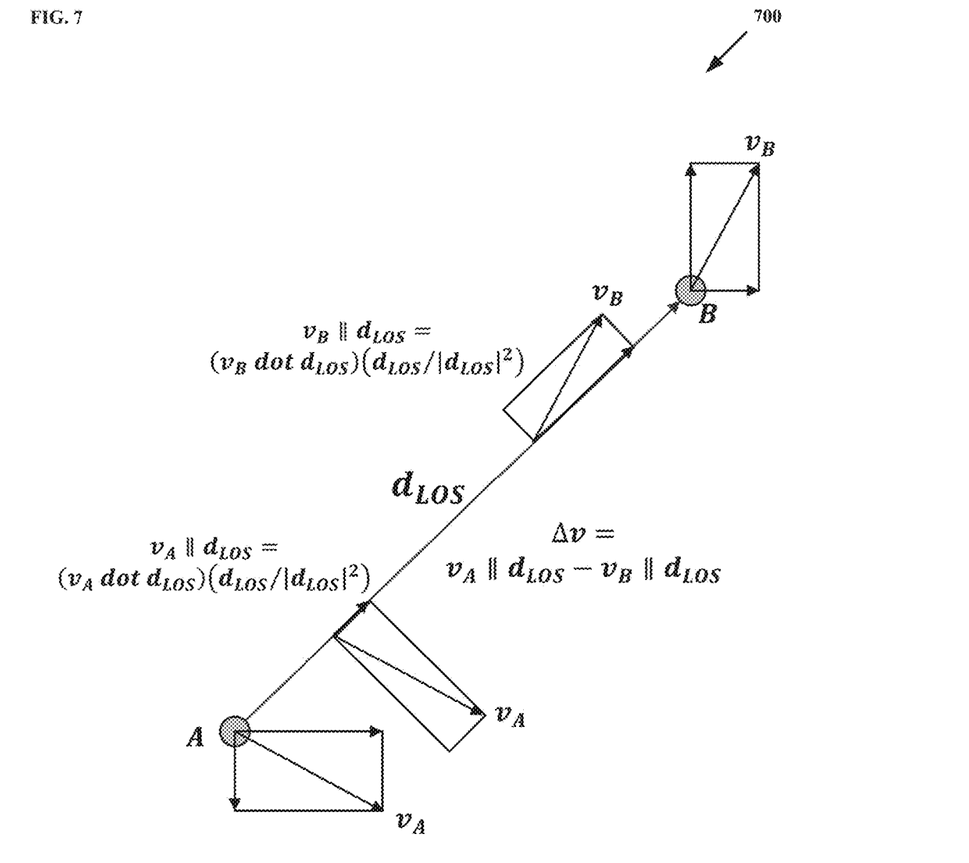
FIG. 7 shows an example of a closing velocity 700 between two nodes A and B.

FIG. 7 shows an example of a closing velocity 700 between two nodes A and B. The closing velocity vector is along the straight line between the transmitter and the receiver, e.g., the line-of-sight vector $d_{LOS}$, which is the difference between the transmitter and receiver locations at a particular point in time. The component of a vector that is parallel to a second vector may be determined by the dot product of the two vectors times the unit vector of the second vector. Thus, the velocity of node A along $d_{LOS}=v_A\|d_{LOS}=(v_A \text{ dot } d_{LOS})(d_{LOS}/|d_{LOS}|^2)$. The velocity of node B along $d_{LOS}=v_B\|d_{LOS}(v_B \text{ dot } d_{LOS})(d_{LOS}/|d_{LOS}|^2)$.

The difference between the parallel components of the two velocity vectors $v_A\|d_{LOS}-v_B\|d_{LOS}$ yields the closing velocity vector $\Delta v$. If $\Delta v$ is positive, the transmitter and receiver are approaching each other, and if $\Delta v$ is negative they are departing from each other. The frequency of the received signal will increase or decrease accordingly.

Multiple closing velocity statements may be generated to complete the set of closing velocities determined for each line-of-sight period between each pair of nodes over the desired time range. Times may be specified relative to a selected reference time. Velocities may be specified in km/second for example.

In an example, closing velocity between a pair of nodes starting at time +9180 may be logged into separate files as:
+9180: 2.382937
+9240: 1.572985
+9300: 0.678300
+9360: −0.257358
+9420: −1.180253
+9480: −2.040070

At 310, the method may optionally consider other relevant constraints. For example, the communications range between satellites and ground stations or terrestrial nodes may be limited by the line-of-sight distance. Physical limitations may apply, including for example transmitter power and transmission losses, receiver sensitivity and reception losses, and propagation losses due to distance and path characteristics. Further, antenna gains at both ends of the communications link may limit the range at which communications are feasible.

The particular data link type may also set a limit on a maximum possible communications range. For example, if a given protocol requires a message acknowledgement faster than is possible given a signal flight time over an excessive range, the protocol may not operate successfully. The effective time range for which communications are possible via a particular line-of-sight may therefore require a corresponding reduction, or an error flag may be set. In general, modeling data link characteristics is difficult, given vagaries in path characteristics and communications system design. Many communications systems are designed such that their communications range always exceeds any anticipated line-of-sight distance and atmospheric attenuation.

At 312, the method may output new contact graph data including the time range and the closing velocity information. The contact graph data files may be directly ingested into contact graph routing software, such as the Interplanetary Overlay Network DTN routing program.

an example of a contact graph file, multiple contact and range statements may be added to complete the contact graph over the desired time range. Range information may be symmetrical (e.g., for a two-way line-of-sight). Contact information however may be unidirectional, due to possible differences in available data rates.

A contact graph may include comment lines, range statements, and contact statements, such as:
Spans between node 1 and node 2
Comment line
a range +9180 +9600 1 2 1
Adds range instance between Nodes 1 and 2, spanning time from 9180 to 9600 seconds from start of epoch, with a one-way signal flight time of 1 second (or less)
a contact +9180 +9600 1 2 10000000
Adds a contact instance going from Node 1 to Node 2, spanning time from 9180 to 9600 seconds from start of epoch, with a data rate of 10 Mbytes per second.
a contact +9180 +9600 2 1 10000000
Adds a contact instance going from Node 2 to Node 1, spanning time from 9180 to 9600 seconds from start of epoch, with a data rate of 10 Mbytes per second.

Figure 8:
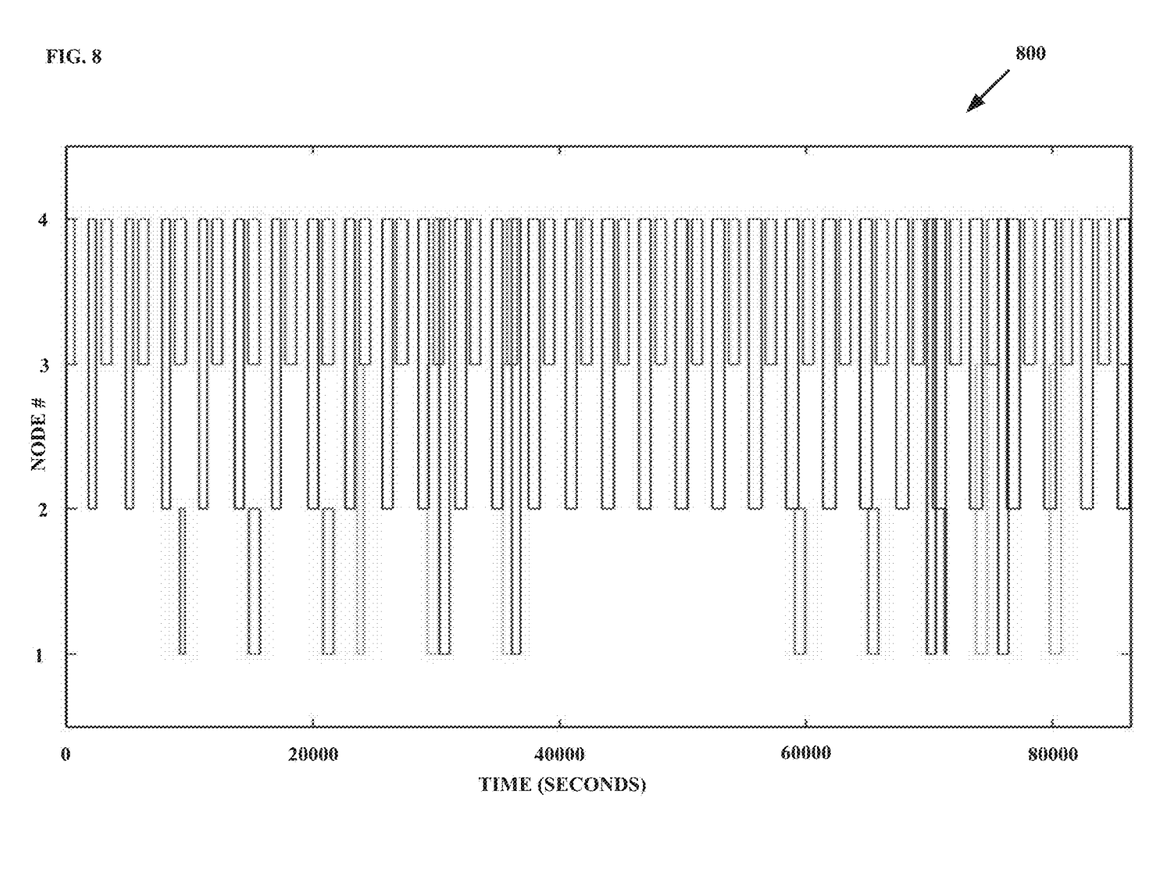
FIG. 8 shows an example of feasible inter-node communications periods 800 over a twenty-four hour period.

FIG. 8 shows an example of feasible inter-node communications periods over a twenty-four hour period. This figure provides a graphical representation of contact graph data. In this example, node 1 is a ground station, and nodes 2, 3, and 4 are satellites. Numerous opportunities for inter-satellite communications and ground station revisits occur, even with a small constellation of satellites. Each rectangle represents an opportunity for data communications between two nodes, and for a depicted time range. Note that nodes 2 and 3 never "see" each other via a line-of-sight, but may nonetheless communicate via relayed transmissions to other nodes. Contact graph routing software may process this new contact graph data to determine the best overall routing scheme for the network.

The method described above may be performed by a mission ground station or may be moved to the individual satellite and/or terrestrial nodes as part of overall network management. The method may be implemented by particular apparatus at one or more of the communications nodes.

For example, a receiver circuit may receive data describing a position and a velocity of one or more nodes, and a predictor circuit may predict future positions of one or more nodes in a common reference frame. A solver circuit may determine a time range of possible line-of-sight communications between two of the nodes, using geometric modeling of the earth to predict a loss of signal. An estimator circuit may estimate a closing velocity between two nodes, and a resulting Doppler shift of communications between the two nodes. Finally, a data generator circuit may output new contact graph data including the time range and closing velocity data.

The method may handle an arbitrary number of satellite and terrestrial nodes. Any arbitrary epoch or starting reference time and relative prediction duration may be selected, or absolute times may be specified by a user. Further, the method may scale its prediction times to perform time-compressed demonstrations of network operations.

The method may select the slowest communications channel data rates according to the transmission and reception data rates specified for each node and inserted into contact statements. By default, range statements may specify a fixed one-way signal flight time of one second, in situations where line-of-sight distances are sufficiently short. For exploratory missions or other scenarios, longer flight times may occur, so transmission and reception times may be coordinated with corresponding lines-of-sight.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An apparatus configured to generate contact graph data indicating availability of line-of-sight communications links between nodes in a communications network, the apparatus comprising:
   a memory; and
   processing circuitry configured to:
   receive data describing a position and a velocity of each of at least two nodes;
   predict future positions of the at least two nodes in a common reference frame based on the received data;
   determine a time range of an available line-of-sight communications link between at least one selected pair of the at least two nodes using geometric modeling of the earth to predict a loss of signal;
   estimate a closing velocity between the selected pair;
   generate contact graph data comprising the time range and the closing velocity; and transmit data between the selected pair when a line-of-sight opens between the selected pair, the line-of-sight opening based on the contact graph data.

2. The apparatus of claim 1 wherein each node comprises one of a fixed ground node, a mobile ground node, an airborne node, a seaborne node, and a spacecraft node.

3. The apparatus of claim 1 wherein the determining further comprises discerning if a distance between the selected pair in the available line-of-sight communications link exceeds a maximum communications range.

4. The apparatus of claim 1 wherein the geometric modeling of the earth comprises analysis of at least one of a spherical model, a WGS84 reference ellipsoid model, a WGS84 geoid model, an EGM96 geoid model, and a global digital elevation model.

5. The apparatus of claim 1 wherein an obstruction of a line-of-sight causes the loss of signal.

6. The apparatus of claim 5 wherein the obstruction is caused by at least one of the earth, the moon, the sun, and another planet.

7. The apparatus of claim 1 wherein the processing circuitry is further configured to process the contact graph data for use by an external program.

8. The apparatus of claim 1 wherein the time range incorporates periods of node inactivity.

9. The apparatus of claim 8 wherein the contact graph-data further includes data rates for the available line-of-sight communications link, and a zero node data rate in the contact graph data indicates the node inactivity.

10. The apparatus of claim 1 wherein the line-of-sight communications link between the selected pair is at least one of electromagnetic and acoustic.

11. A method for generating contact graph data indicating availability of line-of-sight communications links between nodes in a communications network, comprising:
   receiving data describing a position and a velocity of each of at least two nodes;
   predicting future positions of the at least two nodes in a common reference frame based on the received data;
   determining a time range of an available line-of-sight communications link between at least one selected pair of the at least two nodes using geometric modeling of the earth to predict a loss of signal;
   estimating a closing velocity between the selected pair;
   generating contact graph data comprising the time range and the closing velocity; and
   transmit data between the selected pair when a line-of-sight opens between the selected pair, the light-of-sight opening based on the contact graph data.

12. The method of claim 11 wherein each node comprises one of a fixed ground node, a mobile ground node, an airborne node, a seaborne node, and a spacecraft node.

13. The method of claim 11 wherein the determining further comprises discerning if a distance between the selected pair in the available line-of-sight communications link exceeds a maximum communications range.

14. The method of claim 11 wherein the geometric modeling of the earth comprises analyzing at least one of a spherical model, a WGS84 reference ellipsoid model, a WGS84 geoid model, an EGM96 geoid model, and a global digital elevation model.

15. The method of claim 11 wherein an obstruction of a line-of-sight causes the loss of signal.

16. The method of claim 15 wherein the obstruction is caused by at least one of the earth, the moon, the sun, and another planet.

17. The method of claim 11 further comprising processing the contact graph data for use by an external program.

18. The method of claim 11 wherein the time range incorporates periods of node inactivity.

19. The method of claim 18 wherein the contact graph data further includes data rates for the available line-of-sight communications link, and a zero node data rate in the contact graph data indicates the node inactivity.

20. The method of claim 11 wherein the line-of-sight communications link between the nodes is at least one of electromagnetic and acoustic.

21. A non-transitory computer-readable storage medium that stores instructions for execution by at least one processor to operations for generation of contact graph data indicating availability of line-of-sight communications links between nodes in a communications network, the operations to configure processing circuitry to:
   receive data describing a position and a velocity of each of at least two nodes;
   predict future positions of the at least two nodes in a common reference frame based on the received data;
   determine a time range of an available line-of-sight communications link between at least one selected pair of the at least two nodes using geometric modeling of the earth to predict a loss of signal;
   estimate a closing velocity between the selected pair;
   generate contact graph data comprising the time range and the closing velocity; and
   transmit data between the selected pair when a line-of-sight opens between the selected pair, the line-of-sight opening based on the contact graph data.

22. The computer program product of claim 21 wherein each node comprises one of a fixed ground node, a mobile ground node, an airborne node, a seaborne node, and a spacecraft node.

23. The computer program product of claim 21 wherein the instructions for the determining further comprise instructions for discerning if a distance between the selected pair in the available line-of-sight communications link exceeds a maximum communications range.

24. The computer program product of claim 21 wherein the geometric modeling of the earth comprises analyzing at least one of a spherical model, a WGS84 reference ellipsoid model, a WGS84 geoid model, an EGM96 geoid model, and a global digital elevation model.

25. The computer program product of claim 21 wherein an obstruction of a line-of-sight causes the loss of signal.

26. The computer product of claim 25 wherein the obstruction is caused by at least one of the earth, the moon, the sun, and another planet.

27. The computer program product of claim 21 further comprising instructions for processing the contact graph data for use by an external program.

28. The computer program product of claim 21 wherein the time range incorporates periods of node inactivity.

29. The computer program product of claim 28 wherein the contact graph further includes data rates for the available line-of-sight communications link, and a zero node data rate in the contact graph data indicates the node inactivity.

30. The computer program product of claim 21 wherein the line-of-sight communications link between the nodes is at least one of electromagnetic and acoustic.

* * * * *

UNITED STATES PATENT AND TRADEMARK OFFICE
CERTIFICATE OF CORRECTION

PATENT NO. : 10,257,655 B2
APPLICATION NO. : 15/154127
DATED : April 9, 2019
INVENTOR(S) : Mac Allen Cody It is certified that error appears in the above-identified patent and that said Letters Patent is hereby corrected as shown below:

On the Title Page

In item (57), in "Abstract", in Column 2, Line 9, delete "inertial" and insert --Inertial-- therefor In the Specification In Column 3, Line 18, delete "$t_1$," and insert --$t_2$,-- therefor In Column 4, Line 32, delete "example," and insert --example.-- therefor In Column 5, Line 45, delete "UPS" and insert --GPS-- therefor In Column 5, Line 46, delete "UPS-equipped" and insert --GPS-equipped-- therefor In Column 6, Line 1, delete "Ground." and insert --Ground-- therefor In Column 6, Line 13, delete "15206.4940396" and insert --15206.49401396-- therefor In Column 6, Line 17, after "CUBESAT", insert --XI-IV--

In Column 6, Line 18, delete "03031)" and insert --03031J-- therefor

In Column 6, Line 66, delete "joint" and insert --Joint-- therefor

In Column 7, Line 48, delete "($r_e$)" and insert --($r_p$)-- therefor

In Column 7, Line 66, delete "and." and insert --and-- therefor

In Column 8, Line 7, delete "adius" and insert --radius-- therefor

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,257,655 B2

In Column 9, Line 29, delete "for" and insert --$f_0$-- therefor

In Column 10, Line 27, before "an", insert --In--

In Column 10, Line 41, delete "12" and insert --1 2-- therefor

In the Claims

In Column 13, Lines 26-27, in Claim 9, delete "graph-data" and insert --graph data-- therefor In Column 14, Line 14, in Claim 21, after "to", insert --perform--

In Column 14, Line 50, in Claim 26, after "computer", insert --program--